US010299495B2

(12) United States Patent
Moreau

(10) Patent No.: US 10,299,495 B2
(45) Date of Patent: May 28, 2019

(54) DEVICE AND METHOD FOR CO-METERING

(71) Applicant: NESTEC S.A., Vevey (CH)

(72) Inventor: Jean Moreau, Manerbe (FR)

(73) Assignee: Nestec S.A., Vevey (CH)

( * ) Notice: Subject to any disclaimer, the term of this patent is extended or adjusted under 35 U.S.C. 154(b) by 270 days.

(21) Appl. No.: 15/114,270

(22) PCT Filed: Dec. 15, 2014

(86) PCT No.: PCT/EP2014/077785
§ 371 (c)(1),
(2) Date: Jul. 26, 2016

(87) PCT Pub. No.: WO2015/110226
PCT Pub. Date: Jul. 30, 2015

(65) Prior Publication Data
US 2018/0168185 A1   Jun. 21, 2018

(30) Foreign Application Priority Data

Jan. 27, 2014 (EP) ..................................... 14152622

(51) Int. Cl.
*A23G 9/28* (2006.01)
*B65B 3/32* (2006.01)
(Continued)

(52) U.S. Cl.
CPC .............. *A23G 9/282* (2013.01); *B65B 3/326* (2013.01); *B65B 39/005* (2013.01); *B65B 43/59* (2013.01);
(Continued)

(58) Field of Classification Search
CPC ...... A23G 9/282; B65B 3/326; B65B 39/005; B65B 43/59; B65B 2039/009; B65B 2039/222014
See application file for complete search history.

(56) References Cited

U.S. PATENT DOCUMENTS 3,267,971 A   8/1966 Mueller
5,820,913 A   10/1998 Grassler et al.
(Continued)

FOREIGN PATENT DOCUMENTS

CN   2302198 Y   12/1998
EP   1673981   6/2006
(Continued)

*Primary Examiner* — Timothy L Maust
*Assistant Examiner* — Timothy P. Kelly
(74) *Attorney, Agent, or Firm* — K&L Gates LLP

(57) ABSTRACT

The invention relates to a device for co-metering liquid and/or pasty products, including: a first metering unit (41) for metering a first product; a second metering unit (42) for metering a second product (P2); a nozzle (B) including a first duct (1) supplied by the first metering unit (41) and opening out into a first orifice (11), a second duct (2) supplied by the second metering unit (42) and opening out into a second orifice (21), and a third duct (3) opening out into a third orifice (31), the device being configured such that the third duct (3) is supplied by the first and second metering units (41, 42), such that a mixture of the first and second products is discharged by said third orifice (31). The invention also relates to an associated metering method.

10 Claims, 8 Drawing Sheets

Figure 1:
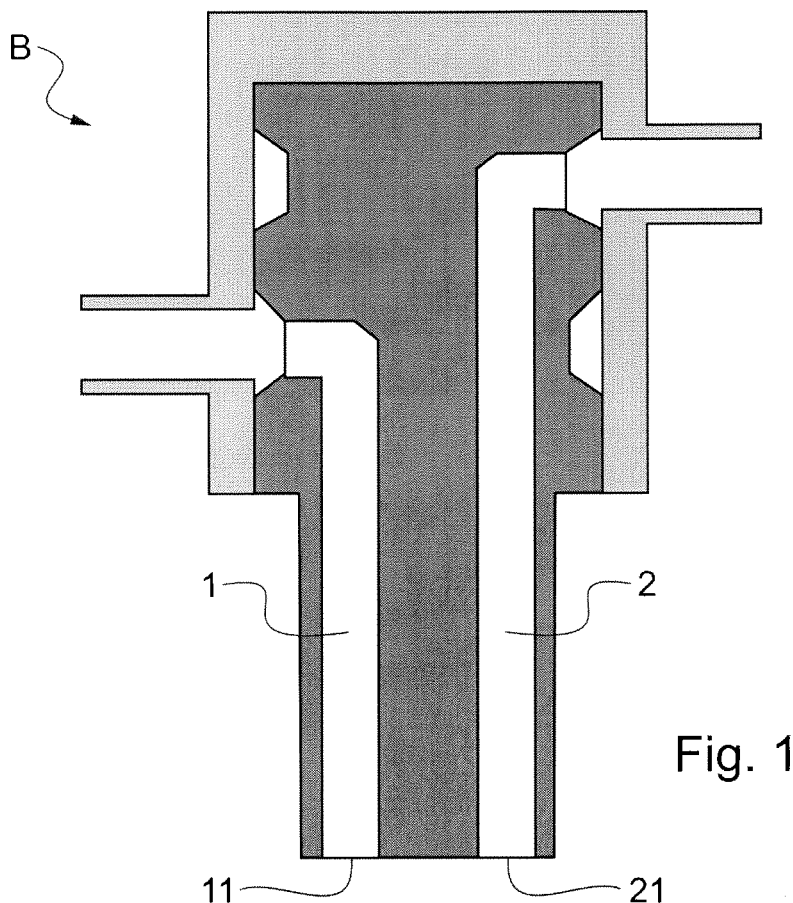

(51) Int. Cl.
  *B65B 39/00* (2006.01)
  *B65B 43/59* (2006.01)
(52) U.S. Cl.
  CPC ..... *B65B 2039/009* (2013.01); *B65B 2220/14* (2013.01)

(56) References Cited

U.S. PATENT DOCUMENTS

| | | | | |
|---|---|---|---|---|
| 6,361,811 | B2* | 3/2002 | Akutagawa | ............... A23G 1/54 |
| | | | | 425/130 |
| 9,894,913 | B2* | 2/2018 | Beuchert | ............... B65B 25/005 |
| 2006/0251783 | A1 | 11/2006 | D'Esposito et al. | |

FOREIGN PATENT DOCUMENTS

| | | |
|---|---|---|
| EP | 2177109 | 4/2010 |
| EP | 2639163 | 9/2013 |
| FR | 2708563 A1 | 2/1995 |
| WO | 0201961 A1 | 1/2002 |
| WO | 2010101576 A1 | 9/2010 |

\* cited by examiner

DEVICE AND METHOD FOR CO-METERING

CROSS REFERENCE TO RELATED APPLICATIONS

The present application is a National Stage of International Application No. PCT/EP2014/077785, filed on Dec. 15, 2014, which claims priority to European Patent Application No. 14152622.8, filed Jan. 27, 2014, the entire contents of which are being incorporated herein by reference.

The present invention relates to a device and method for metering liquid and/or pasty products, in particular food products.

It more particularly relates to the field of metering several liquid and/or pasty products in order to fill a container with these products. The technique called "co-metering" consists of extruding several products at the same time in order to fill a container therewith.

The general principle of co-metering is to supply a so-called co-metering nozzle with several products produced via two or more metering units. A metering unit for example includes a piston pump system. The nozzle is used to discharge the doses of product in an organized manner into the container.

In the field of food products, the co-metering of two or more products in a container, typically transparent, is used more and more to give a shape and an attractive and new visual appearance to the product. This technology is for example frequently used to fill containers of dairy products. Generally, this method is increasingly used in fresh dairy desserts packaged in transparent containers.

The co-metering for example makes it possible to give the finished product (for example, a desert in a container) a colored and contrasted visual appearance. A difference in texture between the co-metered products may also provide the consumer with a new gustatory experience. A successive introduction of different products in a container makes it possible to obtain contrasting visual appearances and textures. However, the layers of different products are then superimposed on one another simply horizontally, which does not give the finished product an innovative visual appearance. This is resolved by the simultaneous introduction of several products during co-metering.

The general principles of co-metering are disclosed in document U.S. Pat. No. 3,267,971. In that document, the nozzle used has a shape specific to the design (final appearance seen from outside the container) that one wishes to obtain. The simplest design is a series of vertical strips.

Other known devices allow a specific design, in particular when the products are dispensed via several ducts included by the nozzle. The nozzle thus generally includes ducts opening into at least as many orifices as there are co-metered products (typically two). These ducts may be supplied continuously, sequentially or alternately. Document FR 2,708,563 thus presents a co-metering device including a nozzle with multiple ducts and orifices.

In order to give the finished product an attractive or original appearance, it is known to create, during the co-metering of several products, a relative vertical and/or rotational movement between the nozzle and the container that is filled. Thus, the nozzle and/or the container may be set in motion. This makes it possible to obtain patterns having a certain originality, such as zigzags or products superimposed on one another in a double helix.

This technique nevertheless has some number of technical difficulties. In general, the number of co-metered products is limited to two, and with rare exceptions, three. Indeed, metering several products into a container involves supplying the packaging line with several different products and requires the use of a metering and distribution system specific to each of those products. The more metering units there are, the more difficult it is to manage industrially the bulk related to their juxtaposition, and the higher the overall design and production costs of the machine. That is why, although some machines are equipped with two metering units, machines equipped with three units are much rarer. The available space in certain packaging machines is also limited and does not allow the juxtaposition of several metering units and nozzle holder tools.

The developed invention seeks to obtain a device and a method for co-metering, making it possible to obtain a finished product including at least three products with highly differentiated visual appearances or textures, on a packaging line including a smaller number of metering units.

Thus, the invention pertains to a device for co-metering liquid and/or pasty products, including:
 a first metering unit for metering a first product;
 a second metering unit for metering a second product;
 a nozzle including a first duct supplied by the first metering unit and opening into a first orifice, and a second duct supplied by the second metering unit and opening out into a second orifice. In such a device according to the invention, the nozzle includes a third duct opening into a third orifice, the device being configured such that the third duct is supplied by the first and second metering units, such that a mixture of the first and second products is discharged by said third orifice.

Thus, the mixture of the first and second products appears to be a third product, separate from the first and second products, in particular if said first and second products have very different colors, shapes and/or textures. The finished product which could be obtained using such a device thus appears to include at least three products with clearly differentiated visual appearances or textures.

According to one embodiment, the device includes a third metering unit, connected to a fourth duct of the nozzle opening out near a fourth orifice. The nozzle may then advantageously include a fifth duct connected to a fifth orifice, the device being configured such that the fifth duct is supplied by the third metering unit and the first metering unit. The nozzle may further advantageously include a sixth duct connected to a sixth orifice, the device being configured such that the sixth duct is supplied by the third metering unit and the second metering unit.

A device according to the invention may advantageously include a static mixer configured so as to homogenize the mixture of the products coming from the two metering units.

The static mixer may be integrated into the nozzle. In other words, the nozzle may include the static mixer(s).

By gathering a maximum number of functions into the nozzle, such as the mixing and the homogenization of the co-metered products, a very compact device may be obtained. Furthermore, a pre-existing production line may easily be adapted to obtain a device according to one embodiment of the invention.

Preferably, the device includes means for sequentially supplying at least one of the ducts of the nozzle.

The metering units may in particular each include a piston or eccentric rotor type pump.

The device may include a container holder and means suitable for creating a relative movement between the nozzle and the container holder. Such a relative movement, optionally conjugated with a sequential supply of the ducts of the nozzle, allows the creation of attractive or original patterns.

The nozzle may be movable. The container holder may be movable. The nozzle and the container holder may both be movable. The notion of mobility is to be understood here in a fixed plane of reference linked to an element of the device fixed relative to the ground.

The invention also pertains to a method for co-metering liquid and/or pasty products, including the following steps:
- providing a first product and a second product to a co-metering device;
- simultaneously and/or sequentially discharging, into a container, via a nozzle of the co-metering device including several orifices, the first product through a first orifice of the nozzle, the second product through a second orifice of the nozzle, and a mixture of the first and second products through a third orifice of the nozzle.

The method may further comprise a step for homogenization of the mixture of the first and second products, prior to the discharge of said mixture.

Thus, at the end of the co-metering method, it is possible to obtain a finished product thus appearing to include at least three products with clearly differentiated visual appearances or textures.

Lastly, the invention relates to a product that may be obtained by implementing the co-metering method for liquid and/or pasty products.

Other particularities and advantages of the invention will also appear in the following description, describing the invention in a general context of co-metering.

Figure 2:
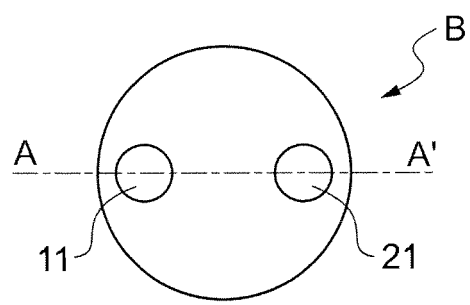
Figure 3:
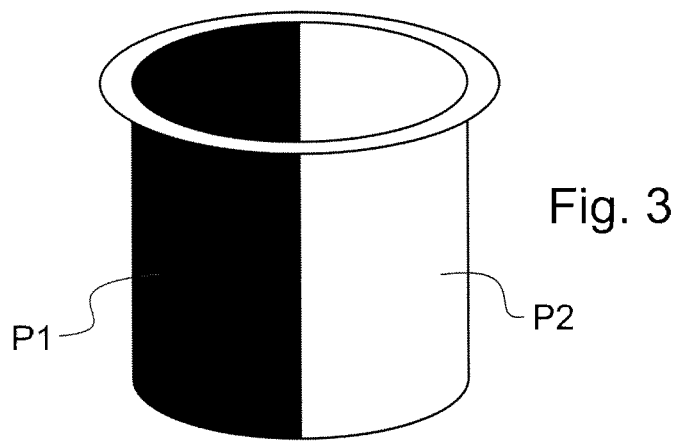
Figure 4:
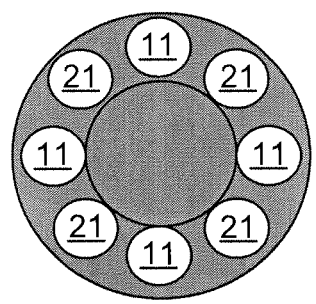
Figure 5:
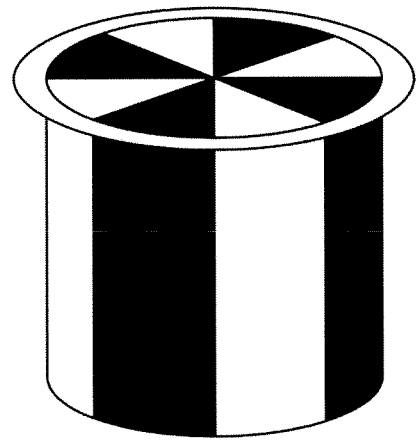
Figure 6:
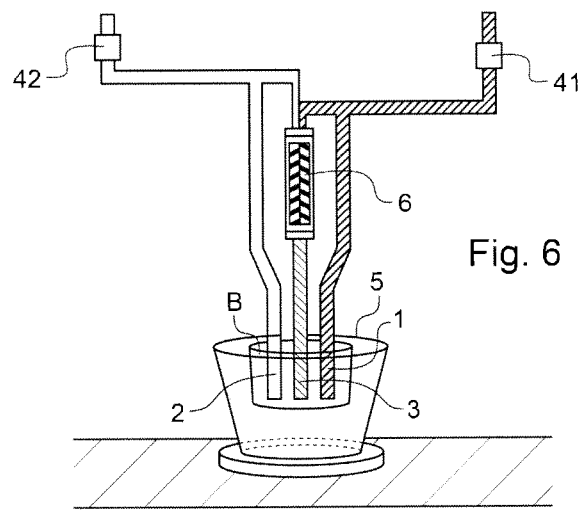
Figure 7:
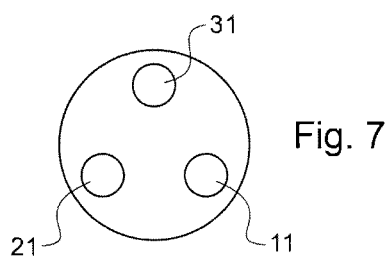
Figures 8, 9:
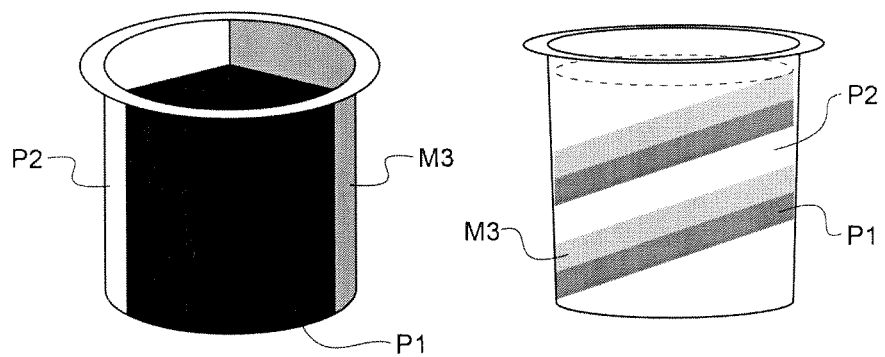
Figure 10:
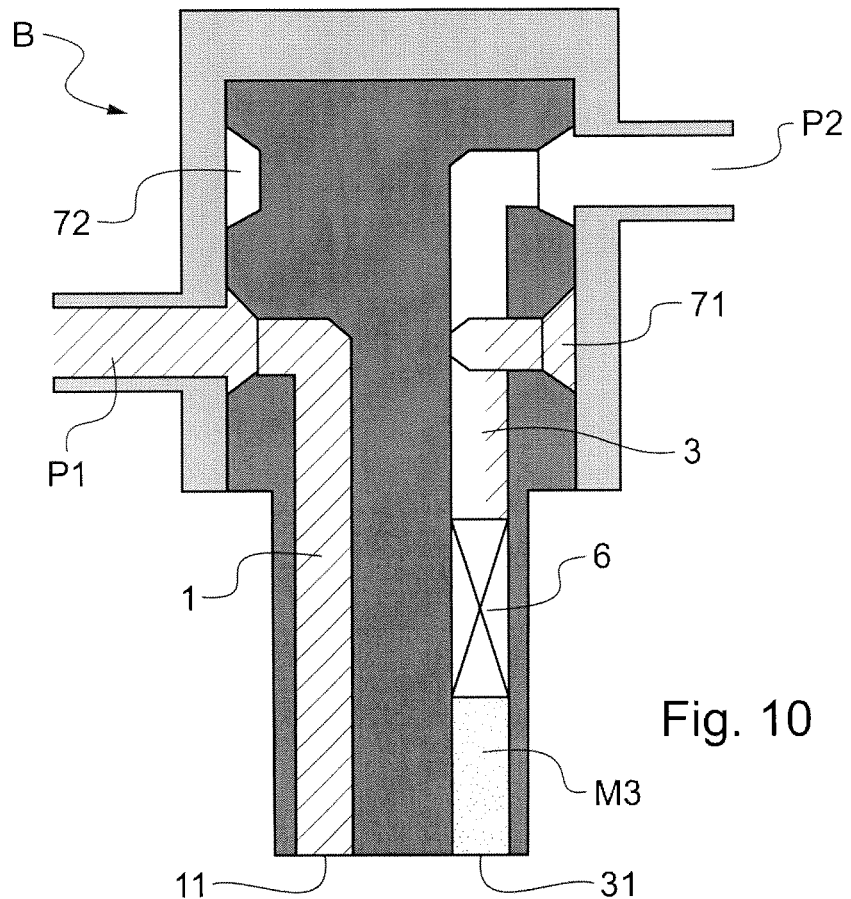
Figure 11:
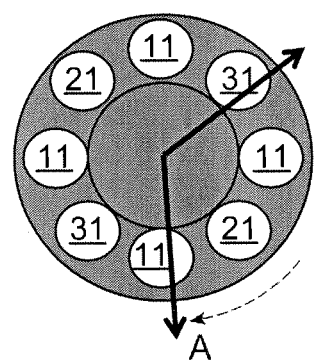
Figure 12:
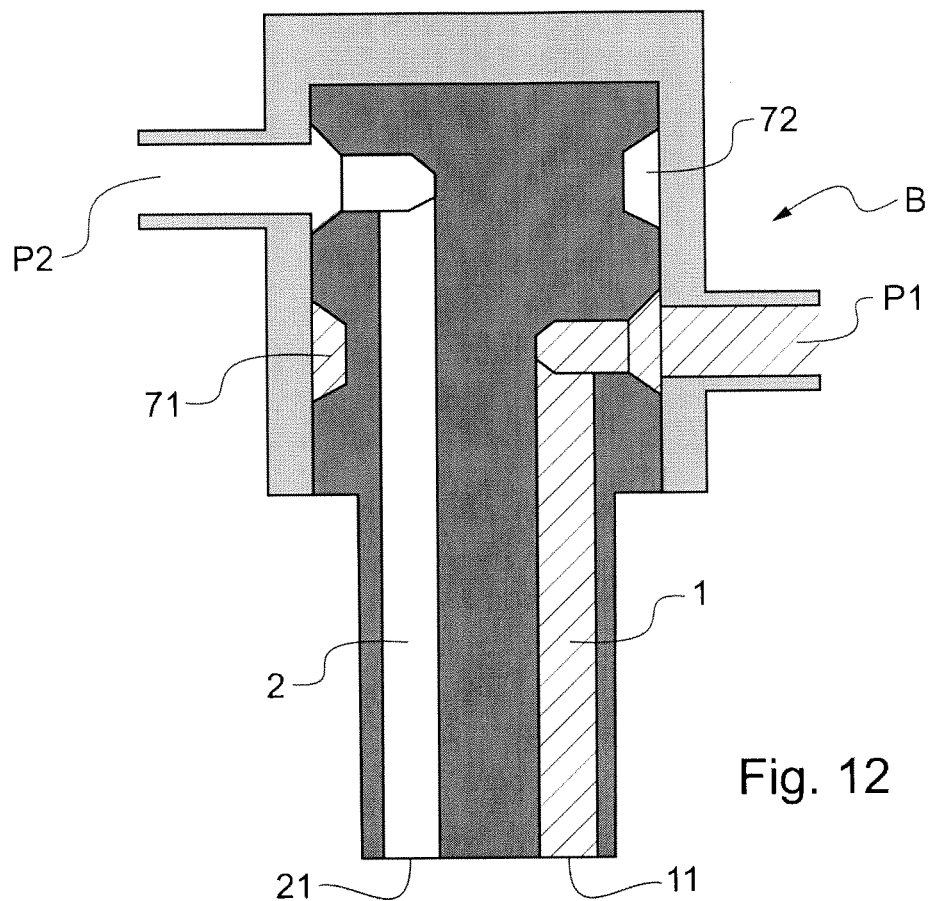
Figure 13:
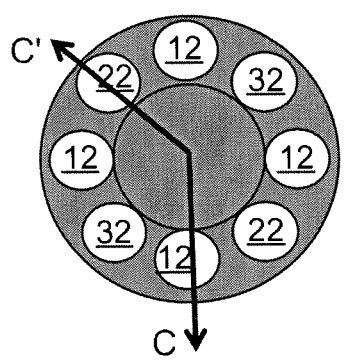
Figure 14:
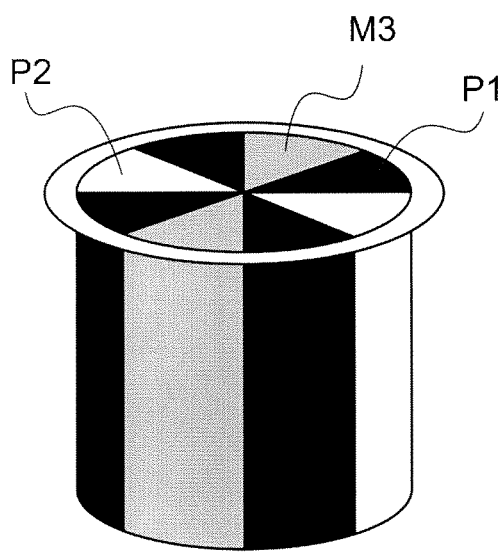
Figure 15:
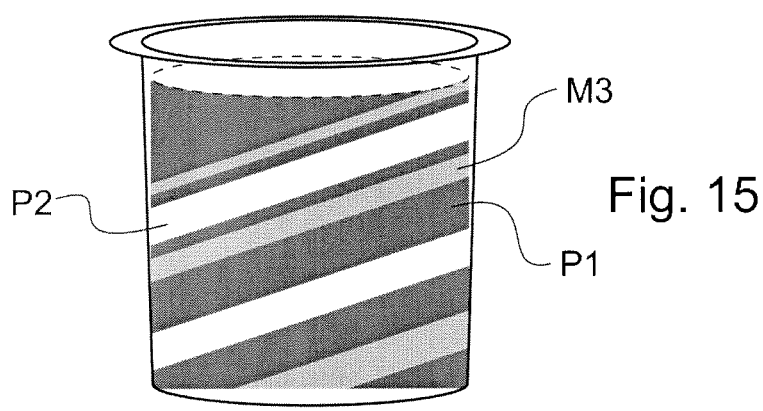
Figure 16:
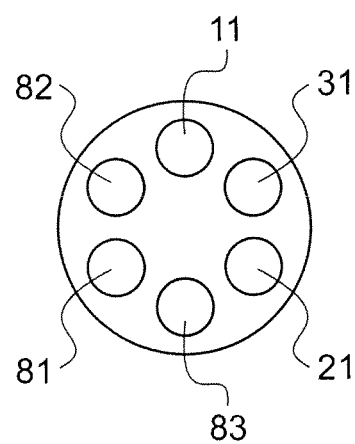
Figure 17:
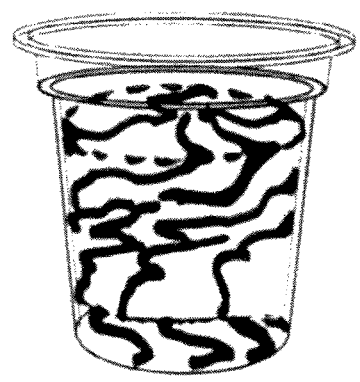
Figure 18:
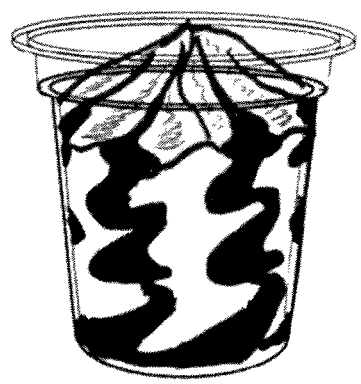

In the appended drawings, provided as non-limiting examples:

FIG. 1 diagrammatically shows a cross-sectional view of a nozzle with several orifices, as known in the state of the art;

FIG. 2 diagrammatically shows the face of the nozzle from FIG. 1 having the orifices;

FIG. 3 diagrammatically shows a finished product, as may be obtained using a co-metering device implementing the nozzle shown in FIGS. 1 and 2;

FIG. 4 diagrammatically shows the face having the orifices of a nozzle according to one known embodiment from the state of the art;

FIG. 5 diagrammatically shows a finished product, as it may be obtained using a co-metering device implementing the nozzle shown in FIG. 4;

FIG. 6 diagrammatically shows a co-metering device according to one embodiment of the invention;

FIG. 7 diagrammatically shows the face bearing the orifices of a nozzle according to one embodiment of the invention;

FIGS. 8 and 9 diagrammatically show two finished products, as they may respectively be obtained using a co-metering device implementing the nozzle shown in FIG. 7;

FIG. 10 diagrammatically shows a first sectional view of a nozzle with several orifices, according to one embodiment of the invention;

FIG. 11 diagrammatically shows the face having the orifices of the nozzle shown in FIG. 10, and helps define the sectional view shown in FIG. 10;

FIG. 12 diagrammatically shows, according to a second sectional view, the nozzle shown in FIGS. 10 and 11;

FIG. 13 diagrammatically shows the face having the orifices of the nozzle shown in FIGS. 10, 11 and 12, and helps define the sectional view shown in FIG. 12;

FIGS. 14 and 15 diagrammatically show two finished products, as they may respectively be obtained using a co-metering device implementing the nozzle shown in FIGS. 10 to 13;

FIG. 16 diagrammatically shows the face bearing the orifices of a nozzle according to one particular embodiment of the invention.

FIGS. 17 to 27 show examples of visual appearances of several finished products in a transparent container, which may be obtained by co-metering contrasting products.

FIG. 1 diagrammatically shows, in sectional view along plane AA visible in FIG. 2, a nozzle B with several orifices 11, 21, as known in the state of the art, for discharging two liquid or pasty products so they may be packaged in a container. The packaging may typically be done in a container that may be transparent or translucent.

FIG. 2 is a diagrammatic illustration of one face of the nozzle shown in FIG. 1, on which face several ducts open out forming the orifices 12, 22 of the nozzle.

A first duct 1 opening into a first orifice 11 is intended to dispense a first pasty or liquid product P1. A second duct 2 opening into a second orifice 21 is intended to dispense a second product P2, pasty or liquid.

The first product P1 and second product P2 may be highly contrasted relative to one another. The contrast may result from one or more organoleptic characteristics of the products P1 and P2, such as the color, taste, texture, viscosity, overrun, for example. In any case, the first product P1 and second product P2 are different from one another. Preferably, the first product P1 and the second product P2 are food products, for example preparations used in dairy desserts.

As a non-limiting example, the first product P1 and the second product P2 are different from one another and selected from among:
- primarily fruit-based preparations, such as puree, compote, coulis, or syrup;
- dairy preparations, optionally flavored, such as yogurt, fresh cheese, quark, cream;
- pastry preparations, such as chocolate pudding, vanilla pudding, caramel, chocolate mousse, jellies.

For example and non-limitingly, the two products to be metered may be a chocolate pudding and a vanilla pudding, a red fruit coulis and a fresh cheese, or a white dairy mousse and a caramel coulis.

FIG. 3 diagrammatically shows a finished product, i.e., the product resulting from the co-metering of several pasty or liquid products in a container, typically transparent, as may be obtained using a co-metering device implementing the nozzle shown in FIGS. 1 and 2. The example shown in FIG. 3 corresponds to the simplest appearance that the finished product may have, i.e., with a distribution of the first product P1 and the second product P2 side-by-side in the container, in equal quantities. The first orifice 11 and the second orifice 21 are shown here with a round mouth. Any mouth shape may nevertheless be considered depending on the final appearance desired for the product.

In general in the co-metering field, to avoid mixing different products in the container and to distribute the co-metered products in the container in the desired manner, a certain know-how is necessary.

Of course, one should have a good mastery of the metered and dispensed volumes of the different pasty or liquid products, but it is also and above all necessary to have good mastery of the flows of these different products in the metering members and during the discharge through the orifices of the nozzle into the container.

For example, the discharge speed of these products must be controlled and reduced to avoid the mixing thereof.

The metering time imposed by the industrial machines also constitutes a major constraint. Indeed, for better productivity, all of the metering operations must be done according to a short cycle, often shorter than two seconds, or even less than one second.

The mechanization of the metering is also a major industrial constraint, since the metering devices are commonly used on so-called multi-track lines, i.e., on which several containers are filled at same time. In such industrial metering lines, generally 10 to 24 containers, or more, are metered at the same time. A metering device must therefore be compact, so that as many devices as there are containers to be filled can be juxtaposed, over the containers, on the line.

Of course, more original appearances than that shown in FIG. 3 may be obtained, and various means and methods are known in the state of the art to do this. For example, instead of having two orifices, the nozzle B may have a larger number of orifices, as shown in FIG. 4. In practice, the nozzle B is configured so that each orifice discharges either the first product P1 or the second product P2. There is therefore, in the nozzle, a set of first ducts 1 opening into a set of first orifices 11, and a set of second ducts 2 opening into a set of second orifices 21.

According to the known embodiment from the state of the art and shown in FIG. 4, the nozzle B includes eight orifices arranged in a circle, such that one orifice intended to expel the product P1 is between two offices that are directly adjacent to it and that are intended to expel the second product P2, and vice versa.

The appearance of the finished product, in a transparent container, able to be obtained using the nozzle shown in FIG. 4, is shown in FIG. 5. The first product P1 and second product P2 are distributed into as many vertical sectors as the nozzle has orifices. In the case at hand, in the example illustrated here, since the products are discharged in equal quantity by each orifice, the finished product in the container has four sectors of first product P1 alternating circularly with four sectors of second product P2.

A helical stack of the products may also be obtained in a known manner by rotating the container during its filling.

FIG. 6 diagrammatically shows a device for co-metering liquid and/or pasty products according to one embodiment of the invention.

The device includes a first metering unit 31 and a second metering unit 32. The first and second metering units 41, 42 make it possible to introduce a precise quantity of products into a container 5 and precisely control the flows of products.

The pieces of metering equipment most commonly used to control the flows of products are positive pumps. The most appropriate one is based on the piston principle. The travel of the piston determines the volume to be metered and the dynamic axis thrust speed determines the dynamic aspiration and ejection. It is in fact important to control the thrust and aspiration speeds. The discharge speed makes it possible to manage the product flow at the outlet, and the aspiration speed allows correct stuffing of the piston chamber with the product, which guarantees an appropriate regularity of the doses introduced upon each cycle. The aspiration speed must nevertheless be controlled and adapted so as to avoid destructuring the metered product.

Other types of pumps may also be used. So-called positive push pumps are particularly appropriate. A positive pump works on the principle of an increase followed by a decrease in the volume of the chamber. Among positive pumps, the following are known in particular: lobe pumps, sinusoidal pumps, membrane pumps, helical pumps. Typically, positive pumps of the eccentric rotor type may be used. Reference is commonly made to Moineau-type pumps. These are particularly well suited to metering filled (including solid particles) and/or highly viscous products. Among positive pumps, so-called lobe or peristaltic pumps may also be used successfully for co-metering.

In a device according to the invention, the first metering unit 31 is configured to meter a first product P1. The device therefore makes it possible to supply first product P1 of the first metering unit 41. The second metering unit 42 is configured to meter a second product P2. The device therefore allows the supply of second product P2 of the second metering unit 32.

The device includes a nozzle B for discharging products. The nozzle includes a first duct 1 and a second duct 2, which are respectively supplied with a first product P1 by the first metering unit 41 and a second product P2 by the second metering unit 42. In the invention, the nozzle includes a third duct 3. The first duct 1 opens out into a first orifice 11 of the nozzle B, the second duct 2 opens out into a second orifice 21 of the nozzle B, the third duct opens out into a third orifice 31 of the nozzle.

The third duct 3 is supplied by the first metering device 41 and by the second metering device 42, such that the third orifice discharges a mixture M3 of the first and second products P1, P2. The mixture M3, inasmuch as the first product P1 and second product P2 are highly contrasted, with different colors, and/or with clearly differentiated textures, may have a shade, a color and/or a texture very different from those of the first product P1 and second product P2, giving the impression that it involves a third product strictly speaking.

The mixture M3 may be homogeneous or may be a partial mixture of the first product P1 and second product P2. The proportion of the first product P1 and second product P2 may be adapted so as to obtain the desired appearance or texture of the mixture M3.

Devices may be used to favor the proper mixing of the first product P1 and second product P2. A static mixer 6 may be used. It may typically be installed in the third duct 3, or upstream from the third duct in a conduit supplied by the first and second metering units 41, 42.

The device described in FIG. 6 makes it possible to obtain a finished product having the appearance diagrammatically shown in FIG. 8. The first product P1, second product P2, and mixture M3 are distributed into three vertical sectors.

By creating a relative movement between the nozzle B and the container 5, it is possible to obtain more original or attractive appearances. For example, in the device shown in FIG. 6, the container is rotated by a rotating holder during its filling by the metering device. This makes it possible to obtain a finished product having the appearance diagrammatically shown in FIG. 9, i.e., having products stacked in a triple helix.

Many alternatives of the device shown in FIG. 6 can be designed without going outside the scope of the invention. Typically, the nozzle B may have more than three ducts and three orifices. Thus, the nozzle shown in FIG. 11 itself has eight orifices, in the case at hand two first orifices 11 for discharging the first product P1, four second orifices 21 for discharging the second product P2, and two third orifices 31 for discharging the mixture M3. Furthermore, several alternatives of the invention may be considered, in particular regarding how the third duct 3 is created and supplied with products. For better compactness of the assembly and so as to be able to easily adapt a pre-existing line provided with only two metering unit, the mixture M3 may be formed directly in the third duct 3 of the nozzle B.

FIG. 10 thus shows, in a diagrammatic sectional view, a nozzle with several orifices 11, 21, 31, in the case at hand eight orifices, according to one embodiment of the invention. FIG. 10 indeed shows, with two section planes, along sector A-A' shown in FIG. 11, so as to show in the same figure a section plane passing through a first duct 1, and a section plane passing through a third duct 3.

FIG. 12 shows, in diagrammatic sectional view, the same nozzle as that shown in FIGS. 10 and 11, along two section planes defined by the sector C-C' in FIG. 13. Thus, the same figure shows a section plane passing through a first duct 1 and a section plane passing through a second duct 2.

The nozzle shown in FIGS. 10 to 13 is supplied with first product P1 and second product P2, respectively by a first metering unit 41 and a second metering unit 42, in two distinct stages of the nozzle. Each stage includes a peripheral groove, i.e., a first peripheral groove 71 and a second peripheral groove 72. Each first, second or third duct is respectively supplied by a tapping in the first peripheral groove 71, the second peripheral groove 72, or in each of the first and second peripheral grooves 71, 72.

The use of a nozzle as shown in FIGS. 10 to 13 makes it possible to obtain a finished product having the appearance diagrammatically shown in FIG. 14. The first product P1, second product P2 and mixture M3 are dispensed in as many vertical sectors as the nozzle has orifices, with the distribution of the sectors defined by the distribution of the orifices of the nozzle B.

Through a relative rotational movement between the nozzle B and the container 5, it is possible to have a finished product whose appearance is shown in FIG. 15. The first product P1, second product P2 and mixture M3 are stacked in a spiral, according to the distribution of the orifices of the nozzle B.

According to another embodiment of the invention, the device may include a third metering unit for metering a third product. As shown in FIG. 16, a nozzle B including multiple orifices has, in addition to a first orifice 11 for discharging a first product P1, a second orifice for discharging a second product P2, a third orifice 31 for discharging the mixture M3, a fourth orifice 81 for discharging the third product. The third product then circulates in a fourth duct of the device, opening out into the fourth orifice 81.

According to various embodiments of the invention, several combinations of the first, second and third products may be done to obtain as many mixtures with a unique shade, color and/or texture. Up to seven products (or mixtures) of different shades, colors and/or textures may be provided by nozzle B when the co-metering device includes three metering units each supplied with a different product: 1) a first product P1; 2) a second product P2; 3) a third product P3; 4) a mixture M3 of the first product P1 and second product P2; 5) another mixture of the first product P1 and third product P3; 6) another mixture of the second product P2 and third product P3; 7) another mixture of the three products.

In the example shown in FIG. 16, six products or mixtures may be provided by the device: in addition to the aforementioned nozzle orifices, the nozzle has a fifth orifice 81 and a sixth orifice 82, the device being configured in the example illustrated here to expel a mixture of the first product P1 and third product P3 through the fifth orifice 81 and a mixture of the second product P2 and third product P3 through a sixth orifice 82.

In such a device configuration, each duct of the nozzle intended to expel a mixture of several products may be equipped with mixing means such as a static mixer.

The device may also include sequential supply means (not shown) for at least one of the ducts. In other words, the device may include means for stopping and resuming, abruptly or gradually, the supply of certain ducts and therefore the supply of products or mixtures by any one or more of the ducts supplied via one of said sequential supply means. The sequential supply means may for example include means for driving appropriate metering units. They may also or alternatively include dispensing valves, for example solenoid valves, to interrupt the flow of product (or mixture) in a given duct during the co-metering.

The developed invention therefore typically makes it possible to obtain a final product visually (or in terms of texture) appearing to include three products, on a packaging line provided for metering only two products, and equipped with only two metering units.

The invention is therefore applicable to the manufacture of many products, in particular food products. For example, with vanilla pudding and dark chocolate pudding, it is possible to obtain a finished product appearing to include three separate products: vanilla pudding, milk chocolate pudding, and dark chocolate pudding. Likewise, with a white cheese and red fruit coulis, it is possible to obtain a finished product appearing to contain a white cheese, a strawberry cheese, and being marbled with lines of red coulis. A white dairy mousse and caramel makes it possible to obtain a finished product showing a juxtaposition of white mousse and chestnut caramel mousse, all striped with dark caramel lines.

The invention thus developed makes it possible to obtain a aspect diversity still unknown in the field, using relatively simple devices. By combining the invention with certain methods or know-how in the field of metering or co-metering liquid or pasty products, a wide variety of innovative or attractive aspects may be obtained. Certain parameters whose mastery is important are described below, and various aspects or patterns of the finished product that can be obtained by mastering these parameters are shown in FIGS. 17 to 27.

The parameters pertain to taking into account characteristics of the metered product(s), the design of the metering devices, whether in terms of the general architecture, the choice of the metering technologies, or the design of the nozzles, the control of the devices, and the control of the relative position of the nozzle and the container filled during the metering.

The rheology of the products to be metered must be correctly taken into account. Indeed, a difference of viscosity or rheological behavior of the products to be metered increases the difficulty of co-metering. Many rheological parameters need to be taken into account: the products may be viscous or liquid, sticky or slippery, foamy or not, etc. Although two semi-viscous products with the same rheological behavior are relatively easy to co-meter, the situation is more complex with a very fluid product and a more viscous product, or when a very dense product is metered in a very airy mousse. A difference in density may in some situations advantageously be used to separate two products. This is for example the case of metering a caramel in a gelled milk, which settles quickly at the bottom of the container.

To control the push and aspiration speeds, simple pneumatic pistons or simple electric motors are not optimal. Motorization using automated digital systems, using a servomotor system, is preferable. This makes it possible to manage the accelerations and movement time of the moving elements of a pump (typically, the moving axis of a piston) to adapt them to the characteristics of the metered products to obtain the desired produced flow. Such motorization and management thereof by automaton also makes it possible to synchronize each of the metering units. In the pushing of two products with highly different viscosities, it is for example appropriate to anticipate the pushing of the more viscous one to obtain a simultaneous exit of both products from the nozzle nose.

An independent motorization of the pistons associated with each product quality is advantageously used.

The opening and closing times of the intake valves, and the discharge from the metering unit and the nozzle, will advantageously be driven independently from the pushing of a product by each metering unit.

Due to the quantity of parameters integrated into the controller, it is preferable to develop clear procedures, typically for each production operator, and to provide safeguard and recall means for the adjustments of the metering devices. This makes it possible to obtain the desired co-metering result reliably and repetitively.

Nevertheless, the old co-metering devices often implement a single motorization for a series of piston metering units, for example via a shared driving bar. One of the drawbacks of these devices lies in the poor control of the volumes displaced from the various pistons. Indeed, the volume aspirated by a piston metering unit is sensitive to the pressure differences, even minimal, commonly observed in product dispensing systems. Yet with a single driving bar, no individual adjustment on a particular metering unit is possible, without changing the adjustment of the other metering unit. Additional systems may be used to offset this problem. For example, a mechanical part may be added to allow an additional adjustment of the travel of a piston. According to another system, the pressure loss experienced by the product metered by a given metering unit is adapted in order to compensate for the effect of the pressure differences on the metering.

One of the essential aspects to be controlled in the co-metering of products is the flow speed of the metered products or mixtures. One of the key parameters influencing this aspect is the choice of diameters, shapes, section surfaces, hoses and ducts used, as well as the nozzle orifice. This then essentially involves adapting the flow speed by calculating the proper passage section. This makes it possible to avoid shearing the product (which may lead to denaturing thereof) through excessive accelerations, and this may in some cases make it possible to give the metered product or mixture an energy useful for its orientation in the container during its discharge. Furthermore, to avoid mixing of the different co-metered products, it is desirable for the respective exit speeds of the products to remain relatively close. It is also important to make sure that the products remain in a laminar regime. Typically, a speed over 0.5 m/s most often causes an impact at the bottom of the container and a movement of the fluid that produces their mixing. Generally 0.5 to 0.25 m/s constitute reasonable flow speeds for industrial co-metering methods.

The applicant has further noted that modifications in the dynamics (speeds, accelerations) of the flow of products lead to a variety of visual aspects of the finished products.

Furthermore, the control of product flows is commonly disrupted by excessive pressure losses. These pressure drops often depend on proper mastery in terms of technical design of the device, well upstream from the metering nozzle. The choice of the diameters of the pipes and hoses is important, and depends on the viscosity of the various products. It is also appropriate to reduce the elbows, valves, and other devices or configurations that are sources of pressure drops.

A different pressure drop experienced by each of the co-metered products may result in a non-simultaneous arrival of the products at the nozzle outlet. It is then difficult to correctly master the exiting product flows.

Each metering unit of a metering or co-metering device is generally supplied with products to be metered by a hopper. The variation of the product level in the hopper that supplies the various pieces of metering equipment may have a negative impact on the regularity of the flow. A regulated supply of the product to maintain a constant level in the hoppers is a positive factor to obtain a good regularity of the flow.

Furthermore, good mastery of the pressure in the same hoppers provides a greater consistency in the rest of the metering or co-metering method. Equipment for creating pressure and maintaining a constant pressure, typically by establishing an air overpressure in the hopper, may be used to correctly control the pressure in the hopper. This is particularly useful and relevant when the metering or co-metering implements compressible products, for example aerated products and foams.

The pressure losses upstream from the metering unit constitute an important aspect. Indeed, an excessive pressure loss due to an inappropriate design of a duct (inadequate diameters, presence of many elbows) between the hopper and the metering member(s) (piston pump, for example) may negatively impact the result obtained downstream, and therefore the metering quality. In a system including several metering units that each supply a nozzle, a disparity in the pressure losses upstream from the metering unit causes a disparity in the volumes metered by each of the metering units. Certain devices make it possible to reduce the disparities or balance the pressure losses. It is also possible to configure the device such that the metering unit, typically a piston metering unit, draws the metered product directly in the hopper.

The pressure losses downstream from the metering unit constitute another important aspect. Indeed, the pressure losses may disrupt the proper flow of the products. The distribution between the metering member and the metering nozzle must tend to generate the smallest possible pressure losses. The pressure losses are in particular related to the distance between the metering unit and the discharge nozzle, which is determined by the general architecture of the metering device. To limit the pressure losses between the metering unit and the nozzle, one simple solution comprises positioning the metering unit above, straight and as close as possible to the nozzle and the containers. The general compactness of the device is therefore important.

However, such a solution is difficult to make compatible with a movable nozzle. Furthermore, this configuration with metering units situated above the containers also complicates the design of so-called "hygienic" machines.

Indeed, in these ultra-clean packaging machines, where a laminar flow is used for hygienic reasons, it is preferable to offset the metering units with their moving parts outside the packaging enclosure (including the filling line for containers). The metering pistons are thus often placed outside the packaging enclosure to free space located perpendicular to the containers to be packaged. Only the nozzles remain in the packaging enclosure, and are connected to metering unit by flexible and/or rigid piping. This generates a significant pressure loss between the metering unit and the nozzle.

The residual pressure upstream and downstream from the metering unit are also influential parameters, mastery of which is important. If the pressure downstream from the metering unit is high, then there is a backflow of the product into the metering chamber during its loading (filling with product to be metered). This distorts the accurate knowledge of the volume actually aspirated, which typically does not correspond to the displacement of the pump. To minimize this phenomenon, the device may be equipped with a system of separating valves that isolates the metering chamber from the zones immediately upstream or downstream, during metering phases (aspiration or discharge). Valves of the rotary slide valve type may be used to that end.

In general, the metering devices that do not use a metering valve immediately downstream from the metering unit and that have an offset nozzle are relatively irregular and imprecise. In this configuration, the dead space of product at the end of metering, i.e., the residual volume situated between the metering unit and the nozzle closing valve, is often much higher than the dose of product displaced and metered.

The residual pressure downstream from the metering unit is all the more important when the metering is done at a fast pace, when the product is viscous and sticky, when the product is compressible and when the downstream length of the piping is large. When one (or a combination) of these parameters causes a high residual pressure, there is a minimum time necessary between the end of metering pushing and the return to pressure equilibrium. This phenomenon is not favorable to a clean cut-off of the product at the outlet of the orifices of the nozzle, and drips and runs may occur. In the case of metering a mousse, for example, the mousse dynamically compressed during the discharge operation tends to expand between two metering cycles in the pipe connecting the metering unit to the discharge nozzle.

Furthermore, the flow of the viscous, sticky products or products whose volume increases by overrun (called overrun products, such as whipped cream) are difficult to interrupt cleanly, in particular at the outlet orifices of the nozzles. An expansion of the product after metering, runs caused by gravity may for example occur.

Several techniques exist to avoid this leakage, and quickly cancel any pressure in the nozzle orifices.

One of these techniques consists of making a cut in the discharge of the product by positioning a closing valve level with the discharge orifices. Thus, there is no or practically no dead space, i.e., residual space in the circuit between the closing valve and the discharge orifice.

This simple solution on a device suitable for the injection of a single product with a nozzle to a single orifice is difficult to implement when the nozzle is provided with multiple discharge orifices.

Some valve systems are configured to allow the simultaneous closing of several discharge orifices. This is typically the case for flat membranes, spherical membranes, complex machined gates, rotating plates and so-called "slide" systems.

The ease of cleaning these moving parts, their wear, sealing problems, and the bulk caused by adding these valves perpendicular to the containers to be filled may be elements making the application of such a system particularly complex.

One technique to avoid runs consists of re-aspirating the product at the end of metering. This is done by creating a slightly negative pressure in the discharge orifice at the end of the metering cycle. This slight lower pressure may be created for example by equipping the circuit with two membrane valves (for example of the so-called "sleeve" membrane type), located upstream from the nozzle. To create the lower pressure, the two valves are closed simultaneously, then the valve furthest downstream (closest to the discharge orifice) is reopened. This vacuum may alternatively be created by a specific product outlet which, by opening, makes it possible to rebalance the pressure in the circuit, causing a drop in the pressure upstream from the discharge orifice of the nozzle.

A closure by sealing member assisted by a dual pneumatic system may also produce this lower pressure, one of the two pneumatic members causing a slight backward return of the sealing member after complete closure. It is also possible to obtain the re-aspiration effect of the product just after the metering using a rotating closing gate having an appropriate design. In metering systems using positive rotary pumps, a brief backward return of the pump may also allow this re-aspiration. Lastly, in systems implementing a motorization of the pistons by servomotors, this "respiration" can be done by simple appropriate programming of the movement of the piston axis.

During the co-metering of several products, in addition to the discharge speed of the products at the outlet of the orifices of the nozzle, the height of the drop into the container is an important parameter to take into account to avoid the mixing of products and achieve a regular appearance in the container.

A constant maintenance of the position (height) of the nozzle with respect to the surface of the products during their co-metering makes it possible to form regular lines. This may be obtained using systems for raising the container on a packaging line using preformed containers, or using a vertical displacement system for the nozzles on the machines. In other words, either the container is moved with respect to the nozzle, or the nozzle is moved with respect to the container so as to maintain a substantially constant drop height of the products. The systems for movement of the nozzle are particularly suitable when the packaging machine used is of the type generally referred to as "Form Fill seal", i.e., a machine that shapes the container that is filled, and seals it, and in particular a so-called "horizontal Form Fill seal" machine. The drop height is therefore an important parameter to obtain a finished product with so-called vertical, or in quarters, metering as shown in FIGS. 3, 5, 8 and 14.

Conversely, it is possible to take advantage of the variation in the drop height of the product to obtain certain aspects. Typically, by bringing the nozzle and the container farther away from or closer to one another several times during filling, a more or less random drop of the products is created. The products then organize themselves in inclined or horizontal layers, and it is for example possible to obtain one of the aspects shown in FIGS. 17 and 18.

Figure 19:
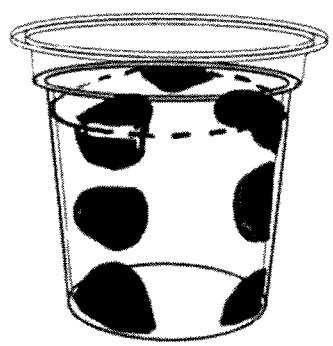
Figure 20:

A slowing or interruption of the raising or lowering movement of the nozzle and/or container during the metering, associated with a discontinuous flow of the products, makes it possible to obtain an aspect as shown in FIG. 19, meaning the aspect of a finished product including a product in which bubbles of another product are included. A motorization of the type referred to as "brushless-servo" provides great ease of controlling the relative movement of the nozzle and the container.

Furthermore, a stop of the nozzle in an intermediate position in the container makes it possible to finalize the surface of a co-metered product by giving it a homogeneous aspect. A slight contact between the outlet orifices and the product at the end of metering, followed by a rapid rising movement toward the upper position, makes it possible to avoid runs and flows for stringy, viscous and sticky products (such as milk caramels, mousses, etc.).

For overrun products, such as whipped cream, for example, an appropriate control of the movement of the nozzle relative to the container (or more specifically relative to the level of product in the container) at the end of metering makes it possible to obtain a dome shape on the surface of the finished product.

For liquid products, driving the drop height also makes it possible, by exerting a movement opposite the drop of the product and by reducing the drop as much as possible, to limit any splashing effect during the fall of the product, or any risk of mixing. This is in particular important to obtain a gentle deposit of a liquid on a low viscosity product by minimizing the risk of mixing of the products.

Furthermore, the control of the drop height of the product, associated with appropriate control of the discharge dynamics of the product during its metering, can also for example make it possible to position a second product in a first product, at the desired depth in said first product.

Furthermore, in addition to imposing a vertical movement on the nozzle and/or the container, it is possible to impart a rotational movement to the nozzle and/or the container to give the finished product a spiral or helical aspect, as shown in FIGS. 9 and 15.

In large-capacity machines in which several containers are metered and filled at the same time, several systems may be considered to perform this function, for example mechanical systems by gears or notched belts for the joint rotation of several containers. The systems used may in particular be similar to the systems known in the field of decorating industrially produced pastries.

The rotation speed, which conditions the number of revolutions performed by the container or the nozzle during a metering cycle, makes it possible to obtain a wide variety of spirals. A large number of revolutions, although difficult to obtain over the duration of a metering cycle, makes it possible to arrange the layers of co-metered products nearly horizontally. The finished product then typically has the aspect shown in FIG. 20.

Figure 21:
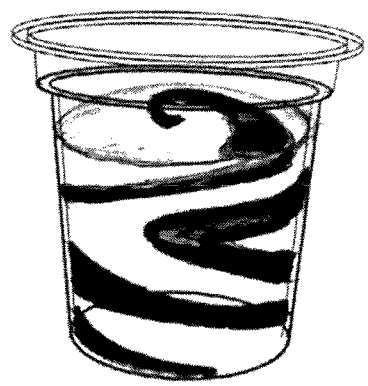

An alternation in the rotation direction during metering gives the product a zigzag spiraling aspect, as shown in FIG. 21.

The use of servomotors to control the rotation or elevation of the nozzle relative to the container makes it possible to finely vary the accelerations, which further increases the variety of aspects that may be obtained. It is for example possible to stretch a spiral vertically by applying a variable speed during the elevation, or conversely to create wider contrasting zones by intermittently slowing the rising speed of the nozzle.

The shape, section, number and position of the discharge orifices of the nozzle constitute parameters that all influence how the product will be organized in the container.

A distribution of the orifices in a circle (at an equal distance from the center of the nozzle, considering the nozzle substantially having a shape of revolution) generally causes, during a simple vertical metering, a geometric shape in sectors, with a straight separation of the products and spreading from the center toward the periphery of the container. Such a distribution is shown in FIGS. 3, 5 and 8.

If the co-metered products have very different viscosities, it is appropriate, to obtain such regularly in the distribution of the products, to position the orifices respectively intended for the discharge of each product at different distances from the center of the nozzle.

If one of the co-metered products is discharged through an orifice situated at the center of the nozzle, this product tends, during its expansion in the container, to push back the other product(s) toward the edges of the container, causing a striped distribution with a lateral design. The exact position of the orifices in order to obtain the desired result, which depends on the dynamic viscosity of the product, is generally obtained and polished through successive trials.

Furthermore, if the section of the discharge orifices of one of the products is reduced to give that product a higher discharge speed than the other products, then that product will tend to organize itself in a zigzag or in a striped manner in the container.

The discharge orifices of the different products may not be positioned in a single plane. This makes it possible, if applicable, to avoid contact between the various products during and at the end of metering. Such contact would be contrary to obtaining a pronounced contrast between different products, due to local mixing.

On the contrary, it may be interesting to have the outlet orifices of one of the products open out in the discharge orifice of a second product, or slightly upstream from the discharge orifice of the other product.

This causes a "gentle" or incomplete mixing of the two products, yielding a particular visual effect, for example marbled. The homogeneity of the mixture may be adjusted by using baffles placed inside the outlet ducts of said second product. The homogeneity of the mixture may be increased by using a static mixer.

The material chosen to make up the nozzle also is important. The nozzles are commonly made from stainless steel. Some plastics with a more hydrophobic behavior toward the products than stainless steel may also be used. Mixing different materials is also possible. Ceramic may also be used.

Figure 22:
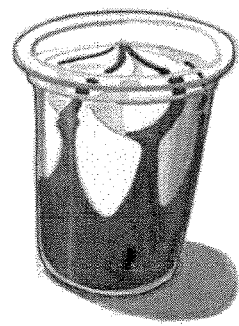

In order to obtain still other aspects of the finished products, it is possible to shift, in time, the discharge phases of the doses of different products, which are therefore not all discharged entirely simultaneously. It is thus possible to begin the discharge of a first product followed by that of a second. The first product covers the bottom of the container, while the discharge of the second product begins. One example aspect of a finished product thus obtained is shown in FIG. 22. The same principle is of course applicable to the co-metering of more than two products.

It is even possible, in the case where the discharge of the first product is stopped when that of the second product begins, to organize the products in superimposed layers.

Figure 23:
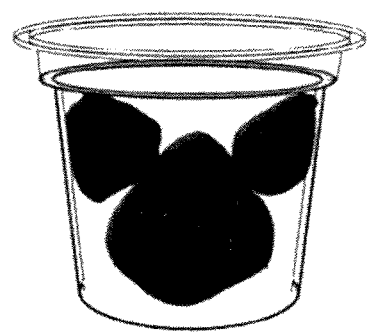
Figure 24:

If one of the products is metered in an alternating manner while another is metered continuously, an aspect having the form of spots may be obtained. The shape of the spots is also affected by the relative vertical movement between the nozzle and the container. Furthermore, the second product may also be distributed alternatingly in various ducts whose distribution makes it possible to obtain non-superimposed spots, as shown in FIGS. 23 and 24.

Figure 25:
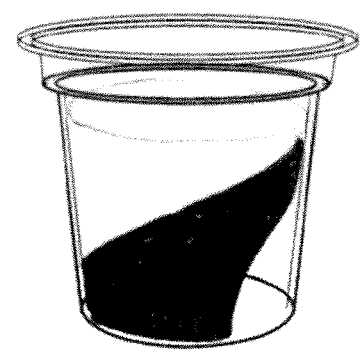
Figure 26:
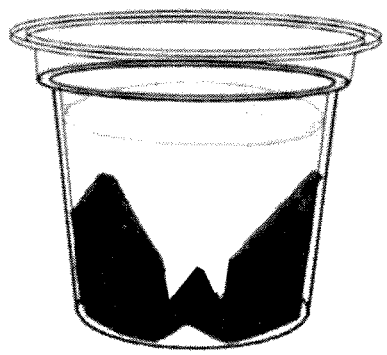

Furthermore, by gradually decreasing the flow of one discharged product while increasing the flow of a second product, the distribution of the products in the container may show a pyramidal shape, as shown in FIG. 25, or a double, triple, etc. pyramidal shape as shown in FIG. 26.

Figure 27:
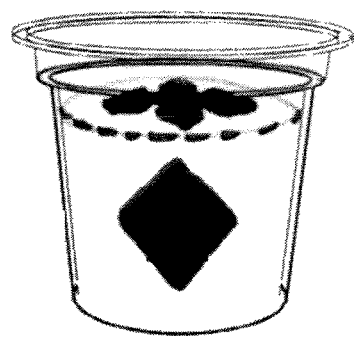

The combination of the techniques previously set out makes it possible to obtain finished products with a complex aspect, having attractive geometric figures, like the finished product shown in FIG. 27.

It is also possible to use a thermostatically-controlled nozzle or metering unit. Indeed, some products must be metered at a temperature higher than their solidification point. This is in particular the case for chocolate or certain gels. The metering unit and/or nozzles are then advantageously temperature-regulated to avoid any clogging by solidified or thickened product. This is important in particular when the packaging line is stopped.

Furthermore, to keep the product at a substantially homogeneous temperature or to avoid a phase separation, it is possible to continuously recirculate the product, which prevents it from stagnating. In this case, only part of the product that is circulating is then metered while another part, generally making up a large majority, is returned toward the hopper.

As shown by the preceding description, a good mastery of co-metering requires the precise configuration and control of many parameters that interact with one another, such that obtaining a complete adjustment achieving the desired result may prove complex.

Typically, more than 20 different parameters need to be adjusted and/or controlled to master the discharge of the co-metered products, dynamically adapt the drop height of the products, and if necessary, adapt the rotational movements. It is therefore preferable for all of the metering equipment to use a high-performing automation and a clear reading system for various parameters, in particular intended for a production operator.

A set of parameters that make it possible to obtain the desired result may be saved. Such a set makes up a recipe. The recipe may in particular be saved on digital storage means. A recipe may be called up by the electronic control device of a metering or co-metering device. Based on such a recipe, a variation of one or more relevant parameters makes it possible to obtain a complete array of attractive visual aspects.

The invention claimed is:

1. A method for co-metering liquid and/or pasty products, the method comprising:
    providing a first product and a second product to a co-metering device;
    homogenizing a mixture of the first product and the second product; and
    simultaneously and/or sequentially discharging, into a container, via a nozzle of the co-metering device including several orifices, the first product through a first orifice of the nozzle, the second product through a second orifice of the nozzle, and the homogenized mixture of the first product and the second product through a third orifice of the nozzle.

2. The method according to claim 1, wherein the first product and the second product are food products.

3. The method according to claim 1, wherein the first product and the second product are different from one another and selected from the group consisting of:
    primarily fruit-based preparations;
    dairy preparations; and
    pasty preparations.

4. The method according to claim 1, wherein the nozzle comprises a third duct opening out into the third orifice, the co-metering device comprising a first metering unit for metering the first product and a second metering unit for metering the second product, and the co-metering device is configured such that the third duct is supplied by the first metering unit and the second metering unit, such that the mixture of the first product and the second product is discharged by the third orifice.

5. The method according to claim 4, wherein the co-metering device comprises a third metering unit connected to a fourth duct of the nozzle opening out into a fourth orifice.

6. The method according to claim 5, wherein the nozzle comprises a fifth duct connected to a fifth orifice, the co-metering device configured such that the fifth duct is supplied by the third metering unit and the first metering unit.

7. The method according to claim 6, wherein the nozzle comprises a sixth duct connected to a sixth orifice, the co-metering device configured such that the sixth duct is supplied by the third metering unit and the second metering unit.

8. The method according to claim 1, wherein the homogenizing of the mixture of the first product and the second product is performed by a static mixer of the co-metering device.

9. The method according to claim 4, wherein the nozzle comprises a first duct supplied by the first metering unit and opening out into the first orifice, and the nozzle further comprises a second duct supplied by the second metering unit and opening out into the second orifice.

10. The method according to claim 9, wherein the co-metering device comprises a member for sequentially supplying at least one of the first duct and the second duct of the nozzle.

* * * * *